United States Patent [19]

Cornwell

[11] Patent Number: 4,495,228
[45] Date of Patent: Jan. 22, 1985

[54] HYDRAULIC CEMENT COMPOSITION AND METHOD FOR USE AS PROTECTIVE COATING FOR SUBSTRATES

[76] Inventor: Charles E. Cornwell, 7104 Marlan Dr., Alexandria, Va. 22307

[21] Appl. No.: 442,120

[22] Filed: Nov. 16, 1982

Related U.S. Application Data

[63] Continuation-in-part of Ser. No. 294,206, Aug. 19, 1981, abandoned.

[51] Int. Cl.³ .......................... B05D 3/02; C04B 7/02
[52] U.S. Cl. .................... 427/385.5; 106/89; 106/314; 427/393.5; 427/393.6; 427/397.7
[58] Field of Search ............... 428/220; 106/314, 89; 264/256, 337; 427/393.6, 397.7, 393.5, 385.5, 421, 427, 428, 429

[56] References Cited

U.S. PATENT DOCUMENTS 4,088,804  5/1978  Cornwell et al. .................. 428/220

*Primary Examiner*—Thurman K. Page

[57] ABSTRACT

A corrosion resistant and fireproof coating for the protection of metal and sealing concrete, brick, mortar and other cementitious substrate by spraying or brushing a coating 4 to 30 mils thickness and allowing the coating to set until hard. Hydraulic cements are combined with selected inorganic minerals and a water reducer that are milled until they all pass through a 100 mesh or finer screen. The blended powder is combined with potable water that are mixed together just before application.

4 Claims, No Drawings

HYDRAULIC CEMENT COMPOSITION AND METHOD FOR USE AS PROTECTIVE COATING FOR SUBSTRATES

CROSS REFERENCE TO RELATED APPLICATION

This application is a continuation-in-part of application Ser. No. 294,206, filed Aug. 19, 1981 now abandoned for Corrosion Resistant and Fireproof Coating.

BACKGROUND OF THE INVENTION

Further research and testing of cementitious coatings as described in U.S. Pat. No. 4,088,804 revealed several problems that were not known at the time of the above patent application. There was not adequate corrosion resistance and many of the finely divided minerals were not suitable for a good coating. It was further found that sodium nitrite and calcium nitrite were not a corrosion inhibitor, in fact, calcium nitrite increased the corrosion of steel. A new approach was then taken to correct these deficiencies as later described. It was further found that calcium stearate did not add to water impermeability. Also, glycol and glycerine were of no value in adding to the corrosion resistance of the coating.

The new environmental restrictions have imposed restrictions on air pollution which have caused major changes in the paint industry. This coating meets or exceeds all Federal and State requirements for paints and coatings.

SUMMARY OF THE INVENTION

This corrosion resistant and fireproof coating starts with a hydraulic cement. For white colors it is necessary to use a white cement such as white portland or white calcium aluminate. To increase the whiteness, titanium dioxide is used. For other color shades, the titanium dioxide can be left out and one or more iron oxides and chromium oxides are added to obtain desired colors. The only super water reducer that does not yellow in my experiment is Melment F-10. Lomar-D and Mighty turn the white coating to a yellow tint in a matter of a few days exposure.

Portland type 1 grey cement can have darker shades and a pozzolonic fly ash can be used for increased resistance to sulfate attack. The iron oxides and chromium oxide may be used to obtain various shades.

Calcium aluminate white cement is used for selected high temperature applications where repeated exposure is required. This cement will normally obtain a usable quality in 24 hours where portland cements cure over a longer period of time. Ceramic frit can be added to obtain a ceramic type finish when subjected to temperatures exceeding 1500° F.

The water reducers comprise the alkali metal of melamine sulfonic acid partially condensed with formaldehyde, the alkali metal salt of naphthalene sulfonic acid partially condensed with formaldehyde, and about 30–90 percent of the alkali metal salt of a high molecular weight condensation product of naphthalene sulfonic acid and the balance 70–10 percent being the alkali salt of gluconic acid. There are some variations in water reducers and selection is made very carefully. Only Melment F-10 is used when a white coating is required and it is the best of all water reducers tested, however, it is the most expensive. Lomar-D and Mighty are acceptable in portland type 1 grey cement as the yellowing effect is not apparent. These super water reducer admixtures bring improved performance. They form a lubricating film, enveloping both the cement and aggregate to reduce friction between the solids. It reduces shrinkage, increased impermeability and improved workability.

Zeothix 265 is a precipitated amorphous hydrated silicon dioxide. Typical properties: Oil absorption, cc/100 g 200–240; average particle size, micrometers 1.5–2.0; surface area, B.E.T., $m^2/g$ 200–300; density, 25° C., g/ml 2.0; refractive index 1.45–1.46; bulk density, packed lb./$ft^3$ 5–7; form powder. It is a synthetic precipitated silica specifically designed for applications requiring thixotropy and viscosity control. This material is made by the J. M. Huber Corporation.

Aerosil is a silica produced from silicon tetrachloride in a flame hydrolysis process with oxygen-hydrogen gas. The diameter of the primary particles varies from approximately 0.7 to 40 nanometers (millimicrons). The structure is amorphous. Aerosil is manufactured by Degussa. The trade name Cabosil is the same material. Hi-Sil is a trade name of PPG Industries for their synthetic thixotropic amorphous silica (silicon dioxide) having an average diameter of 0.022 microns, precipitated as ultrafine, spherical particles in powder form.

Zeothix 265, Aerosil and Hi-Sil 233 are used as a thixotropic agent and it reduces the tendency of the coating from running when sprayed on a vertical surface.

Supersil is a trade name for silica flour from the Pennsylvania Glass Sand Corporation. The silica flour, $SiO_2$ shows a chemical analysis of 99.7 percent silica and 98 percent will pass a 200 mesh screen.

Amorphous silica ($SiO_2$) is 99.5 percent silica. The particle size is 40 micron diameter and below. This amorphous silica definitely adds to the corrosion resistance of the coating when used with portland cement and it increases the bond of the coating to the substrate.

Calcium carbonate was tested and was used in place of the silica flour. Very similar results were achieved and if there is a difference it would be in the hardness and abrasion resistance. The silica flour being a little better.

Wollastonite P-1 is a natural occuring calcium metasilicate ($CaSiO_3$) with an acicular crystaline structure. The melting temperature is more than 2800° F.; it is ground to various sizes. P-1 is a very fine grind and 100% will pass through a 200 mesh screen. These fine fibers are included in the formulation to "tie" the materials together and improve the flexural and impact strengths of the coating.

Titanium dioxide, iron oxide, ferric oxide and chromium oxide are all color pigments used in this coating material.

Frit is "glass variously compounded that is quenched and ground as a basis for glazes or enamels". The frit can be formulated for various melting ranges. There are requirements where it is beneficial to have a hard ceramic type finish when the coating is heated to selected temperatures. The melting point of the frit used is above 1400° F.

Mica is a term applied to a broad class of aluminum silicate type minerals. Muscovite mica is a complex hydrous potassium aluminum silicate, characterized physically by perfect basal cleavage. When milled to the nominal 325 mesh wet ground mica powder, it appears to be off-white to silvery grey and its particles are still laminar.

Water is used to combine the minerals into an aqueous solution with the right viscosity for spraying, brushing or roller application. Generally, the amount of water is based on the weight of the combined mineral products and the ratio is 100 powder and 36 water. Each formulation requires a small amount of water plus or minus to adjust the viscosity. In fact, by reducing the amount of water a putty can be made for patching cracks before the coating is applied. ASTM 2"×2" cubes have been made of this coating "putty" and the compressive strength was over 13,000 PSI in seven days.

A DETAILED DESCRIPTION OF THE INVENTION

Table 1 gives a summary of the compositions of Examples 1 to 9. These formulations were selected from more than 100 tests to show the flexibility of the materials and the compatability of the various combinations. All of the formulations were sprayed and tested for heat resistance and corrosion protection. The heat test consisted of applying a propane torch, over 3000° F., to the coated surface until the steel substrate turned red and then it was quenched in cold water. This test shows any smoke or fumes that may be emitted and the expansion and contraction coefficient of the coating with the steel. The coated steel plates were then placed outdoors for exposure and a 3% salt water solution was brushed on every day for 30 days. There is no corrosion and the coatings appear sound after seven months. Additional tests were conducted in commercial salt fog units for 300 hours with good results.

Examples 1–4 were made with white portland cement and the other finely divided mineral aggregates. Examples 5–7 were made with type 1 grey portland cement and the other finely divided aggregates. Examples 8–10 were made with white calcium aluminate cement and the other finely divided aggregates. Most of the examples used one of the water reducers and color pigments. All of the coloring pigments retain their color very well, even after severe exposure. Freezing and thawing of the coating shows no effect as could be expected from the heat test. According to the Steel Structures Painting Council, a coating that demonstrates the same expansion and contraction ratios of steel is of paramount importance.

Table II gives a summary of the compositions using a so called waterproofing agent such as calcium stearate, and so called rust preventitive agents such as calcium nitrite and sodium nitrite. The retarders such as glycol and glycerine were all tested and proven to be of no value. All parts are by weight.

TABLE I

COATING FORMULATIONS - EXAMPLES 1-10

| | 1 | 2 | 3 | 4 | 5 | 6 | 7 | 8 | 9 | 10 |
|---|---|---|---|---|---|---|---|---|---|---|
| Powder Components | | | | | | | | | | |
| White portland | 100 | 100 | 100 | 100 | — | — | — | — | — | — |
| Grey portland | — | — | — | — | 100 | 100 | 100 | — | — | — |
| Calcium aluminate | — | — | — | — | — | — | — | 100 | 100 | 100 |
| Lomar-D | — | — | — | 1.5 | 1.5 | — | 1.5 | — | 1.5 | — |
| Melment F-10 | 1.5 | 1.5 | — | — | — | 1.5 | — | 1.5 | — | — |
| Mighty | — | — | 1.5 | — | — | — | — | — | — | 1.5 |
| Zeothix 265 | .5 | .5 | — | .5 | — | .5 | — | .5 | — | .5 |
| Aerosil | — | — | .5 | — | .25 | — | .35 | — | .35 | — |
| Supersil | 7 | 7 | 7 | 7 | 5 | 5 | — | 7 | 5 | — |
| Amorphous silica | 15 | 15 | 15 | 15 | 12 | 10 | 10 | 10 | — | 5 |
| Wollastonite P-1 | 10 | — | 10 | 10 | 7 | 25 | 35 | 20 | 35 | 20 |
| Mica | — | 10 | — | — | — | — | — | — | — | — |
| Fly ash | — | — | — | — | 10 | — | 5 | — | — | — |
| Titanium dioxide | 5 | 3 | — | — | — | — | — | 5 | — | — |
| Iron oxides | — | — | 3 | — | 3 | — | 3 | — | 3 | — |
| Chromium oxide | — | — | — | 3 | — | 3 | — | — | — | 3 |
| Frit | — | — | — | 10 | — | 10 | — | — | — | 20 |
| Liquid Component | | | | | | | | | | |
| Water | 49 | 48 | 50 | 50 | 48 | 52 | 56 | 45 | 47 | 45 |

TABLE II

| | 1 | 2 | 3 | 4 | 5 | 6 | 7 |
|---|---|---|---|---|---|---|---|
| Powder Component | | | | | | | |
| White Portland | 100 | 100 | 100 | 100 | 100 | 100 | 100 |
| Melment F-10 | 1.5 | 1.5 | 1.5 | 1.5 | 1.5 | 1.5 | 1.5 |
| Zeothix 265 | .5 | .5 | .5 | .5 | .5 | .5 | .5 |
| Supersil | 7 | 7 | 7 | 7 | 7 | 7 | 7 |
| Amorphous silica | 15 | 15 | 15 | 15 | 15 | 15 | 15 |
| Wollastonite P-1 | 10 | 10 | 10 | 10 | 10 | 10 | 10 |
| Titanium Dioxide | 5 | 5 | 5 | 5 | 5 | 5 | 5 |
| Calcium Stearate | — | .5 | — | — | — | — | .5 |
| Sodium Nitrite | — | — | .5 | — | — | — | .5 |
| Calcium Nitrite | — | — | — | .5 | — | — | — |
| Liquid Component | | | | | | | |
| Water | 49 | 49 | 49 | 49 | 49 | 49 | 50 |
| Glycerine | — | — | — | — | .1 | — | — |
| Ethylene Glycol | — | — | — | — | — | .5 | .5 |
| Tests Results | | | | | | | |
| Corrosion Resistance | E | F | F | F | G | G | F |
| Bonding | E | F | F | F | G | G | F |
| Waterproofing | E | F | F | F | G | G | F |
| Retarding | NA | NA | NA | NA | G | G | G |

E = Excellent
G = Good
F = Failure
NA = Not Applicable

The test results isolated those minerals that were of no value. Example 1 is the standard preferred coating without calcium stearate, sodium nitrite, calcium nitrite, glycerine and glycol. It was found that the coating retains more moisture without the retarders of glycerine and glycol. In fact no retarders are recommended as the mixed coating has a "pot life" of two hours. After spraying the coating is generally dry to the touch within 30 minutes. Rain or fogging with water does not effect the coating after one hour of drying time. However, high humidity decreases curing time and hardness is improved at a faster rate.

Calcium stearate does not add to any of the waterproofing characteristics that are found in the preferred composition.

Sodium nitrite and calcium nitrite decrease the corrosion resistance of the coating and are not recommended.

In Example 7, Table II, the combination of calcium stearate, sodium nitrite and ethylene glycol with the preferred composition shows no improvement.

The coating composition is a two component system. The aqueous component is water. The dry component contains the blend of powdered constituents. The preferred blend of the dry powders is shown in Table II, Example 1. After weighing the correct amount of powder for each type, they are placed in a blender for a period of time to assure complete blending. This blended powder is then run through a milling machine to deagglomerate the particles and to assure a consistent particle size. The dry component is packaged in airtight containers and can then be distributed. Just before use, the amount of dry powder is selected and placed in a mixing container. Water is then added and thoroughly combined to a creamy consistency by high speed mixing. The preferred mixer is described in U.S. Pat. No. 4,007,920 by this inventor. The coating is ready for use and can be applied to a substrate with well known techniques.

The presently preferred composition of the invention contain the following components, in the following ratios, expressed in parts by weight:

|  | COMPONENT | PARTS BY WEIGHT |
|---|---|---|
| Powder Components | Hydraulic Cement | 100 |
|  | Water Reducer | 1–1.5 |
|  | Zeothix 265 | 0–.5 |
|  | Aerosil | 0–.5 |
|  | Hi-Sil | 0–.5 |
|  | Supersil (Silica Flour) | 0–15 |
|  | Amorphous Silica | 0–15 |
|  | Wollastonite | 7–35 |
|  | Mica | 0–10 |
|  | Fly Ash | 0–10 |
|  | Frit | 0–20 |
|  | Calcium Carbonate | 0–15 |
|  | Titanium Dioxide | 0–5 |
|  | Iron Oxide | 0–5 |
|  | Chromium Oxide | 0–5 |
| Liquid Component | Water | 40–56 |

What is claimed is:

1. A corrosion resistant and fireproof coating composition consisting essentially of a hydraulic cement, water reducer, thixotropic agent, finely divided minerals, color pigments and combined with water to make a coating suitable for application on various substrates.

2. A composition according to claim 1, wherein said cement is portland or calcium aluminate; the water reducers are selected from the group consisting of polymers comprising the alkali metal salts of melamine sulfonic acid partially condensed with formaldehyde, the alkali metal salt of naphthalene sulfonic acid partially condensed with formaldehyde, and about 30–90 percent of the alkali metal salt of a high molecular weight condensation product of naphthalene-sulfonic acid and the balance 70–10 percent of the alkali salt of gluconic acid; the thixotropic agents are selected from the group consisting of, a synthetic percipitated amorphous hydrated silicon dioxide, a silica produced from silicon tetrachloride in a flame hydrolysis process with oxygen-hydrogen gas, amorphous silica percipitated as ultrafine, spherical particles in powder form; the finely divided minerals are selected from the group consisting of silica flour, amorphous silica, calcium metasilicate $CaSiO_3$ with acicular crystalline structure, fly ash, frit, mica and calcium carbonate; the color pigments are selected from the group consisting of titanium dioxide, iron oxides and chromium oxide.

3. A composition according to claim 1, wherein the dry components of the composition comprise in weight percent a mineral cement selected from the group consisting of portland or calcium aluminate, 100; a water reducer selected from the group consisting of polymers comprising the alkali metal salts of melamine sulfonic acid partially condensed with formaldehyde, the alkali metal salt of naphthalene sulfonic acid partially condensed with formaldehyde, and about 30–90 percent of the alkali metal salt of a high molecular weight condensation product of naphthalene-sulfonic acid and the balance 70–10 percent of the alkali salt of gluconic acid, 0.5–1.5; a thixotropic mineral selected from the group consisting of, a synthetic percipitated amorphous hydrated silicon dioxide, a silica produced from silicon tetrachloride in a flame hydrolysis with oxygen-hydrogen gas, amorphous silica percipitated as ultrafine, spherical particles in powder form, 0–0.5; a mineral aggregate of 100 mesh or finer selected from the group consisting of silica flour, 0–15; amorphous silica, 0–15; calcium metasilicate $CaSiO_3$ with acicular crystalline structure, 7–35; fly ash, 0–10; frit, 0–20; calcium carbonate, 0–10; a color pigment selected from the group consisting of titanium dioxide, 0–5; iron oxides, 0–3; chromium oxide, 0–3.

4. A process for coating a substrate with corrosion resistant and fireproof coating composition of about 4 mils to 40 mils thick comprising applying the coating composition of claim 1 to a substrate by air spraying, airless spraying, brushing or roller technique.

* * * * *